US006569918B2

(12) United States Patent
Waitkus et al.

(10) Patent No.: US 6,569,918 B2
(45) Date of Patent: *May 27, 2003

(54) POLYMER COMPOSITION FOR CURING NOVOLAC RESINS

(75) Inventors: Phillip A. Waitkus, Sheboygan, WI (US); Theodore N. Morrison, Sheboygan, WI (US)

(73) Assignee: Plastics Engineering Company, Sheboygan, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/498,288

(22) Filed: Feb. 4, 2000

(65) Prior Publication Data

US 2002/0111425 A1 Aug. 15, 2002

(51) Int. Cl.⁷ .................................. B22C 1/22
(52) U.S. Cl. .................. 523/145; 523/147; 524/594
(58) Field of Search ................ 525/500, 501, 525/503, 504, 480, 491; 524/595, 597; 523/145, 147

(56) References Cited

U.S. PATENT DOCUMENTS

| | | | |
|---|---|---|---|
| 3,850,868 A | * 11/1974 | Wismer et al. ............ 260/29.3 |
| 4,003,873 A | 1/1977 | Smith | |
| 4,076,692 A | 2/1978 | Batha et al. ................ 260/59 |
| 4,101,500 A | 7/1978 | Brodsky .................... 260/38 |
| 4,132,699 A | 1/1979 | Bannister et al. ............ 260/38 |
| 4,157,993 A | 6/1979 | Funabiki et al. | |
| 4,624,984 A | 11/1986 | Korb et al. | |
| 4,745,024 A | 5/1988 | Jellinek et al. ............. 428/288 |
| 4,748,214 A | * 5/1988 | Asami et al. ............... 525/503 |
| 4,880,893 A | 11/1989 | Waitkus ...................... 528/129 |
| 4,942,217 A | 7/1990 | Gardziella et al. | |
| 5,189,079 A | 2/1993 | Geoffrey et al. ............ 523/142 |
| 5,648,404 A | 7/1997 | Gerber ...................... 523/145 |
| 5,750,597 A | 5/1998 | Waitkus ...................... 524/35 |
| 5,760,104 A | * 6/1998 | Gerber ...................... 523/145 |
| 5,910,521 A | 6/1999 | Johnson et al. ............. 523/145 |
| 5,945,222 A | 8/1999 | Nagase et al. ............. 428/416 |
| 5,952,447 A | * 9/1999 | Ikeda ........................ 528/163 |

FOREIGN PATENT DOCUMENTS

DE          29 36 954 A       4/1981

* cited by examiner

Primary Examiner—Edward J. Cain
Assistant Examiner—Katarzyna Wyrozebski
(74) Attorney, Agent, or Firm—Quarles & Brady LLP

(57) ABSTRACT

A polymer composition that can be used to cure a novolac resin at a lower temperature than conventional curing agents and with reduced emission of volatile compounds is disclosed. The curing agent composition is prepared by mixing and reacting in aqueous solution a phenolic monomer and an aldehyde in the presence of a basic catalyst to form an intermediate resin, and reacting the intermediate resin with an amine to form the curing agent. The aldehyde to phenolic monomer molar ratio in the reaction should be at least about 1.0:1. The preferred amine is hexamethylenetetramine, and it is preferred that the hexamethylenetetramine to phenolic monomer molar ratio is at least about 0.12:1. The curing agent releases minimal volatile compounds when used to cure novolac resins, and unlike conventional resole curing agents, has an indefinite shelf life in both the pure form and when blended with a novolac resin.

48 Claims, 1 Drawing Sheet

POLYMER COMPOSITION FOR CURING NOVOLAC RESINS

BACKGROUND OF THE INVENTION

1. Field of the Invention

This invention relates to a polymer composition that is useful for curing novolac resins. The polymer composition exhibits reduced emissions of ammonia compared to conventional novolac curing agents such as hexamethylenetetramine, and exhibits higher reactivity compared to conventional novolac curing agents. Furthermore, the polymer composition can be stored for extended times without loss of reactivity.

2. Description of the Related Art

For some time, phenolic resins have been used in applications as diverse as molding compositions, surface coatings, adhesives, laminating resins, casting resins and binders. In the plastics molding field, phenolic resins have been a preferred choice as a molding material for precision moldings that must function in hostile environments because phenolic resins react to form cross-linked structures with excellent dimensional, chemical and thermal stability at elevated temperature.

Phenolic resins are thermosetting resins produced by the condensation of an aromatic alcohol with an aldehyde wherein water is produced as a byproduct. Typically, the aromatic alcohol is phenol and the aldehyde is formaldehyde, but substituted phenols and higher aldehydes have been used to produce phenolic resins with specific properties such as reactivity and flexibility. The variety of phenolic resins available is quite large as the aldehyde to aromatic alcohol ratio, the reaction temperature and the catalyst selected can be varied.

Phenolic resins fall into two broad classes: resole (single stage) resins and novolac (two stage) resins. Resole resins are typically produced with a phenol, a molar excess of formaldehyde and an alkaline catalyst. The reaction is controlled to create a non-cross-linked resin that is cured by heat without additional catalysts to form a three dimensional cross-linked insoluble, infusible polymer. In contrast, novolac resins are typically produced with formaldehyde, a molar excess of phenol, and an acid catalyst. The reaction produces a thermoplastic polymer that can be melted but will not cross-link upon the application of heat alone. The resulting novolac thermoplastic resin can be cross-linked by the addition of a novolac curing agent.

Several curing agents for novolac resins are known in the art, including formaldehyde, paraformaldehyde and hexamethylenetetramine. The most common curing agent is hexamethylenetetramine, which reacts upon heating to yield ammonia and cured resin. These curing agents complete the cross-linking reaction to convert a thermoplastic novolac resin to an insoluble infusible state. However, it has been recognized in the art that each of these novolac curing agents has certain disadvantages. For instance, where hexamethylenetetramine or formaldehyde are used to cure a novolac resin, volatile reaction products are emitted during the cure reaction. Specifically, when the curative is hexamethylenetetramine, ammonia evolves during curing of the novolac resin. In addition, novolac curing agents like hexamethylenetetramine typically require curing temperatures as high as 150° C. Cure temperatures can be lowered by the addition of acids, but this often introduces other problems such as die staining, die sticking and sublimation of organic acids into the atmosphere.

Melamine resins have also been used as a curing agent for novolac resins. (See, for example, U.S. Pat. No. 5,648,404.) However, there are also disadvantages in the use of melamine resins as a curing agent. For instance, it has been recognized that melamine resins typically require either an acid catalyst or elevated temperatures to cure a novolac resin. Also, melamine resin curing agents tend to cure novolac resins more slowly than hexamethylenetetramine and tend to produce a lesser extent of cure, and frequently produce formaldehyde as a side reaction.

Resole resins have also been used as a curing agent for novolac resins. (See, for example, U.S. Pat. No. 4,745,024.) However, there are significant drawbacks with resole resins. First, resole resins have a limited shelf life which can severely limit product reactivity after a resole resin has been stored for a period of time as short as three months. In addition, resole resins have an even shorter shelf life when mixed with a novolac resin. The limited shelf life is caused by self-condensation in the resole resin wherein phenolic nuclei are bridged by methylene groups. Accordingly, resole resin curing agents may not be suitable for manufacturers that wish to purchase resole curing agents in large quantities and place the resole curing agents in inventory for later use. A second drawback with resole resins is that they may contain significant free phenol and formaldehyde levels that may present environmental concerns for some manufacturers. Specifically, conventional resole resins typically contain 4–6% free phenol and may contain free formaldehyde levels of approximately 1%. A final disadvantage of using resole resins to cure a novolac resin is that a fairly large amount of resole is required to achieve a reasonable crosslink density. Typical formulas are 50% resole or more.

Because of the recognized disadvantages with formaldehyde, hexamethylenetetramine, melamine resin and resole resin novolac curing agents, there has been a search for alternative novolac resin curing agents. One proposed alternative novolac resin curing agent is a benzoxaxine polymer disclosed in U.S. Pat. No. 5,910,521. However, it is believed that this polymer may not present an optimum cost effective alternative to known novolac curing agents.

Therefore, there is a continued need for other alternative novolac resin curing agents that emit limited volatile compounds, such as ammonia, during the novolac cure reaction, that have low levels of free phenol and formaldehyde, that have extended shelf life, and that have lower temperatures for cure activation.

SUMMARY OF THE INVENTION

The foregoing needs in the art are met by a polymer composition in accordance with the present invention that can be used to cure a novolac resin at a lower temperature than conventional novolac curing agents and with only limited emissions of volatile compounds. A polymer composition in accordance with the present invention also retains reactivity over extended storage times.

A polymer composition in accordance with the present invention is useful for curing a novolac resin, and comprises the product of mixing and reacting in aqueous solution a phenolic monomer and an aldehyde in the presence of a basic catalyst to form an intermediate resin, and reacting the intermediate resin with an amine to form the polymer composition. The aldehyde to phenolic monomer molar ratio in the reaction should be at least about 1.0:1, and preferably is at least about 2.0:1. The preferred amine is hexamethylenetetramine, and it is preferred that the hexamethylenetetramine to phenolic monomer molar ratio be at least about 0.12:1. In a preferred version of the invention, the aldehyde is formaldehyde, and the phenolic monomer is selected from the group consisting of phenol, substituted phenols, and mixtures thereof, with phenol itself being the most preferred phenolic monomer.

The unreacted phenolic monomer in a polymer composition in accordance with the present invention may be adjusted to levels less than about 3.0 weight percent. Preferably, the unreacted phenolic monomer in the polymer composition is less than about 1.0 weight percent, and most preferably, the unreacted phenolic monomer in the polymer composition is less than 0.5 weight percent. Without intending to be bound by theory, it is believed that by reacting a phenolic monomer with a molar excess of an aldehyde and an amine, the amine keeps the reaction mixture from quickly gelling thereby allowing higher levels of the aldehyde to be introduced into the reaction mixture. The increased levels of aldehyde serve to lower the free phenol levels.

The low unreacted phenolic monomer levels of the polymer composition can be particularly advantageous for manufacturers that presently use conventional resoles for curing novolac resins. For instance, it is well known that conventional resole curing agents typically contain 4–6% free phenol and that phenol emissions and discharges are regulated by certain environmental protection agencies. When a novolac resin is cured with a resole, the free phenol may be liberated as a gas during curing, or may be discharged into process water in the case of slurry molding processes. As a result, manufacturers often must use pollution control equipment to control phenol emissions and discharges and comply with various regulations. By replacing a conventional resole with the polymer curing agent of the present invention, a manufacturer may be able to comply with environmental regulations without the use of pollution control equipment. However, it should be appreciated that the polymer composition is also effective at curing novolac resins when the unreacted phenolic monomer in the composition is greater than about 3.0 weight percent.

The unreacted aldehyde in a polymer composition in accordance with the present invention may be adjusted to levels less than about 0.1 weight percent. This is also particularly advantageous in that the formaldehyde levels in many products are subject to various environmental regulations including reporting requirements. By replacing a conventional resole with the polymer curing agent of the present invention, a manufacturer may be able to more easily comply with certain environmental regulations. The reduced levels of phenolic monomer and formaldehyde in the polymer may also reduce the odors emitted by products molded with a composition including a novolac resin and the polymer curing agent.

In addition, the polymer of the invention, unlike conventional resole curing agents, has an indefinite shelf life in both the pure form and when blended with novolac resins. Experimental data indicates that samples of the polymer will remain essentially unchanged for over a year. Without intending to be bound by theory, it is believed that by reacting a phenolic monomer with a molar excess of an aldehyde and an amine, the available crosslinking sites in the polymer are depleted, yielding a substantially inactive polymer. An unexpected result is that the substantially inactive curing agent polymer of the invention lowers the cure temperature of a novolac resin compared to novolac resins cured with other conventional novolac resin curing agents. Another unexpected result is that the amount of curing agent required for cure is less than the amount of conventional resole resin required for a similar degree of cure. This is particularly advantageous in that resole resins can be quite expensive due to the smaller batch sizes used in production and lower yields.

In one application of the curing agent polymer of the present invention, an effective amount of the polymer is mixed with a solid novolac resin or a solution of a novolac resin to replace conventional curing agents. An effective amount is the amount of the crosslinking polymer composition required to yield the desired extent of cure. The resulting curable novolac composition may then be cured in the conventional manner. Optionally, the curable novolac composition prepared with the curing agent polymer composition of the present invention may include an additional curing agent that supplies methylene bridging groups, such as hexamethylenetetramine. In this application, the polymer of the invention also acts as a cure accelerator and a flow modifier.

In another application of the curing agent polymer of the present invention, an effective amount of the polymer is mixed with a solid or liquid novolac resin and at least one filler to produce a curable composition. Novolac resins and fillers commonly used in curable compositions are suitable for use in this application of the polymer of the invention. Non-limiting examples of fillers are glass fibers, carbon fibers, graphite fibers, ceramic fibers, mica, clays, talcs, cellulosic fibers such as wood flour and cotton fibers, organic fibers such as aromatic polyamide fibers, as well as ground, cured phenolic resins and compounds.

It is therefore an advantage of the present invention to provide a curing agent for novolac resins.

It is another advantage of the present invention to provide a curing agent for novolac resins that lowers the cure temperature of the novolac resin compared to novolac resins cured with other conventional novolac resin curing agents.

It is a further advantage of the present invention to provide a curing agent for novolac resins that does not lose reactivity when stored alone or when stored admixed with a novolac resin.

It is yet another advantage of the present invention to provide a curing agent for novolac resins that is stable when the curing agent and a novolac resin are blended before curing and may be used with molding compositions including conventional fillers.

It is still another advantage of the present invention to provide a curing agent for novolac resins that releases limited quantities of ammonia when the curing agent and a novolac resin are blended together and cured.

It is a further advantage of the present invention to provide a curing agent for novolac resins that contains extremely small amounts of free phenol.

It is yet another advantage of the present invention to provide a curing agent for novolac resins that contains extremely small amounts of free formaldehyde.

It is still another advantage of the present invention to provide a curing agent for novolac resins that assists in the production of a cured novolac resin that releases limited odors.

These and other features, aspects, and advantages of the present invention will become better understood upon consideration of the following detailed description, drawings, and appended claims.

DETAILED DESCRIPTION OF THE INVENTION

Figure 1:
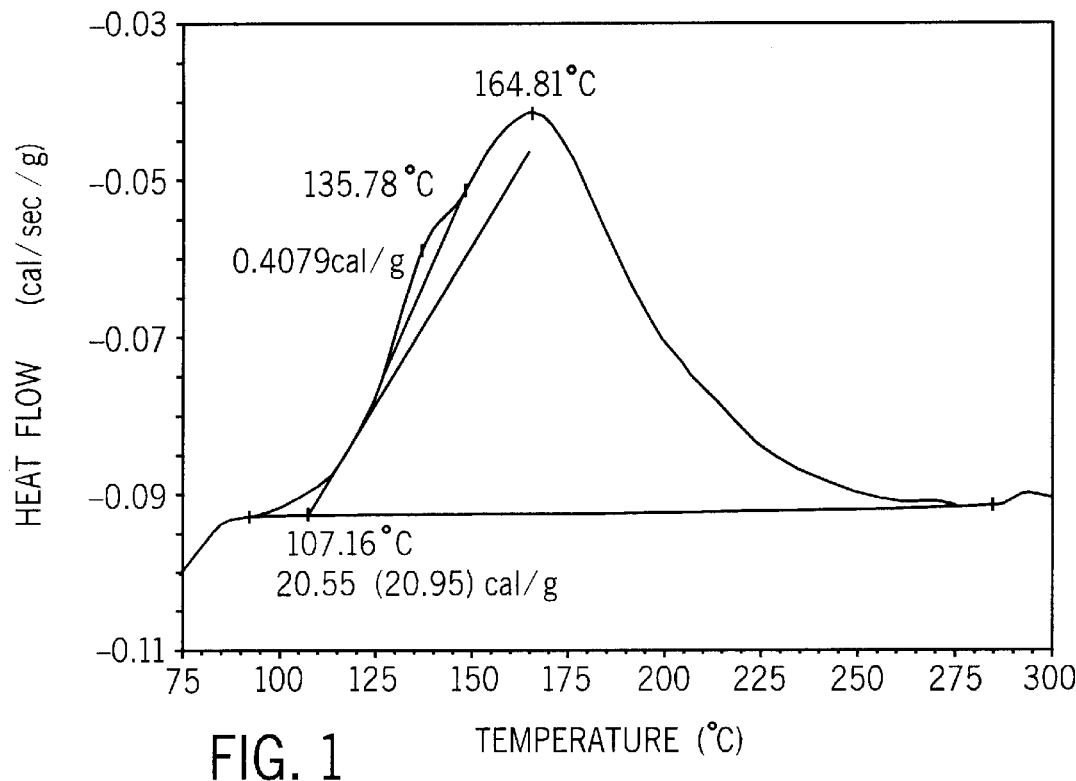
FIG. 1 is a differential scanning calorimetry graph of a novolac resin cured with a polymer composition in accordance with the invention.

A preferred procedure for making a novolac curing agent polymer composition in accordance with the invention involves blending a phenolic monomer with an aldehyde source and enough water to keep the mixture fluid. The mixture is then cooled to a safe temperature (typically less than 40° C.) and a neutral or basic catalyst is added to the mixture. The temperature of the mixture is raised to react the phenolic monomer and the aldehyde to obtain an intermediate resin. At this point, an acid may be added to neutralize any basic catalyst. A reactive amine is then added to the intermediate resin and reacted until the amine is sufficiently consumed. Water may then be removed to obtain a desired viscosity. Solvents can also be added to obtain the desired fluid properties. If a solid polymer is desired, water and other volatiles are removed and the molten resin is heated until the resin has the desired melt point. The resin is then rapidly cooled. Preferably, the reaction is carried out in a reaction vessel equipped with a heater, a mixer, and a reflux condenser connected to a vacuum source. During the reaction, the heater and vacuum are manipulated so that the reaction mixture refluxes at a desired reaction temperature. Water and other volatiles may be removed by vacuum distillation.

In the preferred procedure for making the novolac curing agent polymer composition, the reaction times and temperatures may vary and are somewhat dependent on the basic catalyst selected. The purpose of preparing the intermediate resin is to consume the phenolic monomer and to tie in the aldehyde so that it is not lost during distillation. The extent of reaction is a function of the reaction time and temperature. Longer reaction times are required for lower reaction temperatures. For example, when the phenolic monomer is phenol, the aldehyde is formaldehyde, and the basic catalyst is calcium hydroxide, typical reaction temperatures and reaction times may vary from 2–6 hours at 70° C. to 20–60 minutes at 90° C.

If a liquid novolac curing agent polymer composition in accordance with the invention is desired, the intermediate resin should have a lower extent of reaction. Water is removed just until the desired viscosity is obtained. Typically, the final viscosity is in the range of 5 poise to 500 poise. A liquid novolac curing agent polymer composition in accordance with the invention can also be obtained by adding a suitable solvent to the resin such as methanol, ethylene glycol or the like. If a solid novolac curing agent polymer composition in accordance with the invention is desired, the final reaction after adding the amine must be at a higher temperature than the target melt point. At higher reaction temperatures, the target melt point will be reached in less time. For practical handling, the softening point of a solid novolac curing agent polymer composition in accordance with the invention should be above 70° C. Typical softening points range from 70° C. to 120° C.

In the preferred procedure for making the novolac curing agent polymer composition, the term "phenolic monomer" and the term "aldehyde" each have established meanings of scope in the art of phenolic resins and are used throughout this disclosure and claims in accordance with their art established meanings. Thus, the "phenolic monomer" can be a phenol, a substituted phenol, a mixture of substituted phenols, or a mixture of phenol and substituted phenols. A preferred phenolic monomer is phenol itself. Non-limiting examples of substituted phenols are cresol isomers, resorcinol, xylenol isomers, cardanol, and the like. Similarly, the term "aldehyde" has reference to organic compounds containing the characteristic group: R—CHO. Preferably, the aldehyde is aqueous formaldehyde or paraformaldehyde. Non-limiting examples of other suitable aldehydes include: aliphatic aldehydes, such as propionic aldehyde, butylaldehyde, acetaldehyde and the like; aromatic aldehydes such as benzaldehyde and the like; cyclic aldehydes such as furfural and the like; and mixtures thereof.

The neutral or basic catalyst may be a mineral base such as an alkali metal hydroxide, an alkaline earth metal hydroxide, an alkali metal oxide, or an alkaline earth metal oxide. Non-limiting examples include: calcium hydroxide, magnesium oxide, barium hydroxide, sodium hydroxide, potassium hydroxide, and lithium hydroxide. The basic catalyst may also be an organic base such as ammonia, hexamethylenetetramine, trishydroxymethylaminomethane, and the like. The mole ratio of the basic catalyst to the phenolic monomer is preferably about 0.01:1 to about 0.03:1. The acid may be any acid suitable for neutralizing the basic catalyst. Non-limiting examples are oxalic acid, sulfuric acid, phosphoric acid, and nitric acid. The reactive amine may be hexamethylenetetramine, ammonia, or a source of ammonia.

The total aldehyde to total phenolic monomer molar ratio should be at least about 1.0:1, but if less than 1% unreacted phenolic monomer is desired in the final novolac curing agent polymer composition in accordance with the invention, the total aldehyde to total phenolic monomer molar ratio should not be less than about 2:1. It should be appreciated that the total aldehyde to total phenolic monomer ratio refers to the total amount of phenolic monomer present before a reaction, including any mixture of phenols.

The total amine to total phenolic monomer molar ratio controls the reactivity of the final novolac curing agent polymer composition. When the amine is hexamethylenetetramine, a measurable boost in reactivity with a novolac resin, compared to the reactivity of a standard resole towards the same novolac resin, can be obtained with a total amine to total phenolic monomer molar ratio of at least about 0.12:1. Higher total amine to total phenolic monomer molar ratios increase the reactivity. At total amine to total phenolic monomer molar ratios higher than about 0.25:1, unreacted amine becomes detectable but reactivity continues to increase. When the amine is ammonia, the total amine to total phenolic monomer molar ratios must be four times larger than when the amine is hexamethylenetetramine, i.e., at least about 0.48:1.

A novolac curing agent polymer composition in accordance with the invention may be stored separately for later blending with a novolac resin, or may be blended in an effective amount with a novolac resin to form a curable novolac composition. Preferably, the curable novolac composition includes about 20 weight percent to about 98 weight percent of the novolac resin and about 2 weight percent to about 80 weight percent of the polymer composition in accordance with the invention. The curable novolac composition may also include a curing agent that supplies methylene bridging groups such as hexamethylenetetramine. Preferably, the curing agent is hexamethylenetetramine and is present in the curable novolac composition in an amount of less than about 26 weight percent hexamethylenetetramine.

A novolac curing agent polymer composition in accordance with the invention may also be blended with a novolac resin and at least one filler to form a curable composition. Preferably, the filler is selected from the group consisting of cellulosic materials, fiber materials, refractory materials, and mixtures thereof. Preferably, the curable composition includes about 20 weight percent to about 98 weight percent of the novolac resin and about 2 weight percent to about 80 weight percent of the polymer composition in accordance with the invention. The curable composition may also include a curing agent that supplies methylene bridging groups such as hexamethylenetetramine. Preferably, the curing agent is hexamethylenetetramine and is present in the curable composition in an amount of less than about 26 weight percent hexamethylenetetramine.

EXAMPLES

The following examples serve to further illustrate the invention. Examples 1 to 13 describe the preparation of a crosslinking polymer in accordance with the invention. Examples 1a–11a describe the use of the crosslinking polymers prepared in Examples 1–11 in the curing of a novolac resin (i.e., Example 1a describes the use of the polymer prepared in Example 1 in the curing of a novolac resin, Example 2a describes the use of the polymer prepared in Example 2 in the curing of a novolac resin, etc.). Example 14 describes the curing of a novolac resin using a blend of hexamethylenetetramine and a crosslinking polymer in accordance with the invention. Example 15 is a comparative example that describes the curing of a novolac resin using hexamethylenetetramine. Examples 16 and 16a are comparative examples that describe the curing of a novolac resin using a conventional solid resole. Example 17 describes the curing of a crosslinking polymer in accordance with the invention. Example 18 is a comparative example that describes the curing of a conventional solid resole. Example 19 shows the effect of aldehyde and amine to phenolic monomer molar ratios on unreacted free phenol in a polymer in accordance with the invention. Example 20 shows the effect of the amine to phenolic monomer molar ratio on the reactivity of a polymer in accordance with the invention. Example 21 shows the effect of a blend of a conventional novolac curing agent and a polymer in accordance with the invention on the curing of a novolac resin. Examples 22–30 demonstrate the use of a polymer in accordance with the present invention in a molding composition. Example 31 demonstrates the use of a polymer in accordance with the present invention in the binding of foundry sand. Example 32 demonstrates the use of a polymer in accordance with the present invention in the preparation of a paper laminate. Example 33 demonstrates the use of a polymer in accordance with the present invention in the preparation of a fabric cloth laminate. Example 34 demonstrates the use of a polymer in accordance with the present invention in the preparation of a glass fiber laminate. Example 35 demonstrates the use of a polymer in accordance with the present invention in the binding of felt materials. Example 36 demonstrates the use of a polymer in accordance with the present invention in the preparation of propant sands. The examples are not intended to limit the invention in any way.

Examples of the Preparation of a Crosslinking Polymer of the Invention

Example 1

Into a four liter stainless steel resin flask equipped with a mechanical stirrer, a thermometer, and a reflux condenser, was placed 1200 grams phenol (12.75 moles) and 1632 grams aqueous 52% by weight formaldehyde (28.26 moles). The reaction mass was cooled to 43° C. and 15.0 grams hydrated lime (0.202 moles) in a slurry with 30 grams water was added. The reaction mass was heated to 90° C. in 17 minutes and held at 90° C. for 25 minutes. The reflux condenser was then switched to a receiver attached to a vacuum source. The reaction mass was then vacuum distilled to 80° C. at an absolute vacuum of 4.6 cm. At this point, the reaction vessel was opened and 684 grams (4.88 moles) hexamethylenetetramine was added in a slurry with 852 grams water, together with 18.0 grams (0.0505 moles) glycerolmonooleate. The pressure in the reaction mass was then reduced to 9.7 mm absolute pressure and the mass distilled to a final temperature of 95° C., adjusting the agitator power and speed so as to not overload the capabilities of the agitator. When the power load on the agitator drive reached 110–120 watts at a speed setting of 5, the resin was discharged to pans in layers approximately 1.5–2.5 inches thick and allowed to cool.

The yield was found to be 2486 grams. The melt point was 85° C. The unreacted phenol was measured to be 0.37%. The product had a maximum rate of reaction as measured by DSC at 204° C. when measured alone.

The key experimental variables of Example 1 can be summarized as follows: (1) phenolic monomer=phenol; (2) aldehyde=formaldehyde; (3) amine= hexamethylenetetramine; (4) catalyst=hydrated lime (calcium hydroxide); (5) aldehyde to phenolic monomer mole ratio=2.22; (6) amine to phenolic monomer mole ratio=0.383; (7) hold temperature=90° C.: (8) hold time=25 minutes; (9) final distillation temperature=95° C.; and (10) final crosslinking polymer form=solid.

Example 2

Into a four liter stainless steel resin flask equipped with a mechanical stirrer, a thermometer, and a reflux condenser, 1000.0 grams phenol (10.625 moles) and 1200 grams aqueous 52% by weight formaldehyde (20.782 moles) was placed. The reaction mass was cooled to 43° C. and 80.0 grams of a 25% solution of tetramethylammoniumhydroxide in methanol (0.219 moles) was added. The reaction mass was heated to 90° C. in 22 minutes and held at 90° C. for 35 minutes. The reflux condenser was then switched to a receiver attached to a vacuum source. The mass was then vacuum distilled to 80° C. at an absolute vacuum of 4.6 cm. At this point, the reaction vessel was opened and 600 grams (4.28 moles) hexamethylenetetramine was added in a slurry with 800 grams water, together with 15.0 grams (0.0421 moles) glycerolmonooleate. The pressure in the reaction mass was then reduced to 9.7 mm absolute pressure and the mass distilled to a final temperature of 100° C., adjusting the agitator power and speed so as to not overload the capabilities of the agitator. When the power load on the agitator drive reached 110–120 watts at a speed setting of 5, the resin was discharged to pans in layers approximately 1.5–2.5 inches thick and allowed to cool.

The yield was found to be 2020 grams. The melt point was 83° C. The unreacted phenol was measured to be 0.75%. The product had a maximum rate of reaction, as measured by DSC, at 161° C. when measured alone.

The key experimental variables of Example 2 can be summarized as follows: (1) phenolic monomer=phenol; (2) aldehyde=formaldehyde; (3) amine= hexamethylenetetramine; (4) catalyst= tetramethylammoniumhydroxide; (5) aldehyde to phenolic monomer mole ratio=1.956; (6) amine to phenolic monomer mole ratio=0.403; (7) hold temperature=90° C.: (8) hold time=35 minutes; (9) final distillation temperature=100° C.; and (10) final crosslinking polymer form=solid.

Example 3

Into a four liter stainless steel resin flask equipped with a mechanical stirrer, a thermometer, and a reflux condenser, was placed 1200 grams phenol (12.75 moles) and 1512 grams aqueous 52% by weight formaldehyde (26.18 moles). The reaction mass was cooled to 43° C. and 15.0 grams hydrated lime (0.202 moles) in a slurry with 30 grams water was added. The reaction was heated to 90° C. in 18 minutes and held at this temperature for 38 minutes. The reflux condenser was then switched to a receiver attached to a vacuum source. The mass was then vacuum distilled to 80° C. at an absolute vacuum of 4.6 cm. At this point the reaction vessel was opened and 324 grams (2.31 moles) hexamethylenetetramine was added dry. The pressure in the reaction mass was then reduced to 9.7 cm. and the mass distilled to a final temperature of 100° C., adjusting the agitator power and speed so as to not overload the capabilities of the agitator. When the power load on the agitator drive reached 110–120 watts at a speed setting of 5, the resin was discharged to pans in layers approximately 1.5–2.5 inches thick and allowed to cool.

The yield was found to be 2100 grams. The melt point was 89° C. The unreacted phenol was measured to be 0.85%. The product had a maximum rate of reaction, as measured by DSC, at 144° C. when measured alone.

The key experimental variables of Example 3 can be summarized as follows: (1) phenolic monomer=phenol; (2) aldehyde=formaldehyde; (3) amine=hexamethylenetetramine; (4) catalyst=hydrated lime (calcium hydroxide); (5) aldehyde to phenolic monomer mole ratio=2.05; (6) amine to phenolic monomer mole ratio=0.181; (7) hold temperature=90° C.: (8) hold time=38 minutes; (9) final distillation temperature=100° C.; and (10) final crosslinking polymer form=solid.

Example 4

Into a four liter stainless steel resin flask equipped with a mechanical stirrer, a thermometer, and a reflux condenser, was placed 800 grams phenol (8.50 moles) and 1488.0 grams aqueous 52% by weight formaldehyde (25.77 moles). The reaction mass was cooled to 43° C. and 4.8 grams (0.119 moles) chemical grade magnesium oxide was added dry. The reaction was heated to 75° C. in 22 minutes and held at 75° C. for 30 minutes then cooled to 43° C. At this point, 12.0 grams (0.0336 moles) glycerolmonooleate was added followed by 864 grams (7.40 moles) 30% ammonium hydroxide. The reaction mass was then heated to 70° C. and held for 30 minutes. The reflux condenser was then switched to a receiver attached to a vacuum source. The pressure in the reaction mass was then reduced to 9.7 mm absolute pressure and the mass distilled to a final temperature of 99° C., adjusting the agitator power and speed so as to not overload the capabilities of the agitator. When the power load on the agitator drive reached 110–120 watts at a speed setting of 5, the resin was discharged to pans in layers approximately 1.5–2.5 inches thick and allowed to cool.

The yield was found to be 1357 grams. The melt point was 77° C. The unreacted phenol was measured to be 5.4%. The product had a maximum rate of reaction, as measured by DSC, at 158° C. when measured alone.

The key experimental variables of Example 4 can be summarized as follows: (1) phenolic monomer=phenol; (2) aldehyde=formaldehyde; (3) amine=ammonia; (4) catalyst= magnesium oxide; (5) aldehyde to phenolic monomer mole ratio=3.03; (6) amine to phenolic monomer mole ratio= 0.870; (7) hold temperature=75° C.: (8) hold time=30 minutes; (9) final distillation temperature=99° C.; and (10) final crosslinking polymer form=solid.

Example 5

Into a four liter stainless steel resin flask equipped with a mechanical stirrer, a thermometer, and a reflux condenser, was placed 800 grams phenol (8–50 moles), 200 grams o-cresol (1.85 moles) and 1200 grams aqueous 52% by weight formaldehyde (20.78 moles). The reaction mass was cooled to 44° C. and 4.8 grams chemical grade magnesium oxide (0.119 moles) was added dry. The reaction was heated to 90° C. in 29 minutes and held at 90° C. for 35 minutes. The reflux condenser was then switched to a receiver attached to a vacuum source. The vacuum in the reaction mass was adjusted to 27 in. and the mass distilled to 80° C. At this point, 600 grams (4.28 moles) hexamethylenetetramine was added in a slurry with 800 grams water, followed by 16.0 grams (0.0449 moles) glycerolmonooleate. The mass was then distilled to a final temperature of 100° C. at 27 in. vacuum, adjusting the agitator power and speed so as to not overload the capabilities of the agitator. When the power load on the agitator drive reached 110–120 watts at a speed setting of 5, the resin was discharged to pans in layers approximately 1.5–2.5 inches thick and allowed to cool.

The yield was found to be 1936 grams. The melt point was 73° C. The unreacted phenol was measured to be 0.41%. The product had a maximum rate of reaction, as measured by DSC, at 211° C. when measured alone.

The key experimental variables of Example 5 can be summarized as follows: (1) phenolic monomer=80% phenol/20% o-cresol; (2) aldehyde=formaldehyde; (3) amine=hexamethylenetetramine; (4) catalyst=hydrated lime (calcium hydroxide); (5) aldehyde to phenolic monomer mole ratio=2.01; (6) amine to phenolic monomer mole ratio=0.414; (7) hold temperature=90° C.: (8) hold time=35 minutes; (9) final distillation temperature=102° C.; and (10) final crosslinking polymer form=solid.

Example 6

Into a four liter stainless steel resin flask equipped with a mechanical stirrer, a thermometer, and a reflux condenser, was placed 1200 grams phenol (12.75 moles), and 1632 grams aqueous 52% by weight formaldehyde (28.26 moles). The reaction mass was cooled to 44° C. and 15.0 grams chemical grade hydrated lime (0.202 moles) was added dry. The reaction was heated to 85° C. in 20 minutes and held at this temperature for 35 minutes. The reflux condenser was then switched to a receiver attached to a vacuum source. The vacuum in the reaction mass was adjusted to 9.7 cm and the mass distilled to 85° C. At this point, 450 grams (3.21 moles) hexamethylenetetramine was added in a slurry with 570 grams water. The condenser was switched back to reflux and the reaction was heated to 85° C. and held for 20 minutes. The mass was then distilled to a final temperature of 85° C. at 9.7 cm absolute vacuum. With vigorous stirring, 800 grams methanol was slowly added and the resin was cooled.

The yield was found to be 2995 grams. The viscosity was 24 poise.

The key experimental variables of Example 6 can be summarized as follows: (1) phenolic monomer=phenol; (2) aldehyde=formaldehyde; (3) amine=hexamethylenetetramine; (4) catalyst=hydrated lime (calcium hydroxide); (5) aldehyde to phenolic monomer mole ratio=2.22; (6) amine to phenolic monomer mole ratio=0.252; (7) hold temperature=85° C.: (8) hold time=35 minutes; and (9) final crosslinking polymer form=solution of solid curing agent in methanol.

Example 7

A cross-linking polymer was prepared using the procedure of Example 1 with:
(1) a formaldehyde to phenol monomer mole ratio of=2.0; and (6) a hexamethylenetetramine to phenol monomer mole ratio of 0.18.

Example 8

A cross-linking polymer was prepared using the procedure of Example 1 with:
(1) a formaldehyde to phenol monomer mole ratio of=2.5; and (6) a hexamethylenetetramine to phenol monomer mole ratio of 0.25.

Example 9

A cross-linking polymer was prepared using the procedure of Example 1 with:
(1) a formaldehyde to phenol monomer mole ratio of=2.2; and (6) a hexamethylenetetramine to phenol monomer mole ratio of 0.11.

Example 10

A cross-linking polymer was prepared using the procedure of Example 1 with:
(1) a formaldehyde to phenol monomer mole ratio of=2.2; and (6) a hexamethylenetetramine to phenol monomer mole ratio of 0.64.

Example 11

A cross-linking polymer was prepared using the procedure of Example 1 with:
(1) a formaldehyde to phenol monomer mole ratio of=2.17; and (6) a hexamethylenetetramine to phenol monomer mole ratio of 1.19.

Example 12

A cross-linking polymer was prepared using the procedure of Example 1 with:
(1) a formaldehyde to phenol monomer mole ratio of=2.17; and (6) a hexamethylenetetramine to phenol monomer mole ratio of 0.64.

Example 13

A cross-linking polymer was prepared using the procedure of Example 1 with:
(1) a formaldehyde to phenol monomer mole ratio of=2.00; and (6) a hexamethylenetetramine to phenol monomer mole ratio of 1.44.

Examples of Curing Novolac Resins with a Polymer in Accordance with the Invention

Evaluation

Differential Scanning Calorimetry (DSC) was used to determine the curing temperatures of the novolac/curing agent mixtures prepared in the following Examples. Curing temperatures were determined by sealed mode DSC on blends containing a novolac resin and (1) a curing agent as prepared in Examples 1–11, (2) a curing agent as prepared in Example 1 and hexamethylenetetramine, and (3) a comparative curing agent such as hexamethylenetetramine or a resole. The DSC tests were run at a heating rate of 10° C. per minute up to 300° C.

Example 1a

A mixture of 25 parts by weight of the cross-linking polymer prepared in Example 1 and 100 parts by weight of a solid novolac resin analogous to the solid novolac resin commercially available as Plenco® 13157 novolac resin from Plastics Engineering Company of Sheboygan, Wis., USA had a maximum rate of reaction, as measured by DSC, at 142° C. The low temperature cure peak area was 6.7 cal./g. In addition, no hexamethylenetetramine was detected by water extraction.

Example 2a

A mixture of 25 parts by weight of the cross-linking polymer prepared in Example 2 and 100 parts by weight of a solid novolac resin analogous to the solid novolac resin commercially available as Plenco® 13157 novolac resin had a maximum rate of reaction, as measured by DSC, at 140° C. The low temperature cure peak area was 6.7 cal./g.

Example 3a

A mixture of 25 parts by weight of the cross-linking polymer prepared in Example 3 and 100 parts by weight of a solid novolac resin analogous to the solid novolac resin commercially available as Plenco® 13157 novolac resin had a maximum rate of reaction, as measured by DSC, at 135° C. The low temperature cure peak area was 2.4 cal./g.

Example 4a

A mixture of 25 parts by weight of the cross-linking polymer prepared in Example 4 and 100 parts by weight of a solid novolac resin analogous to the solid novolac resin commercially available as Plenco® 13157 novolac resin had a maximum rate of reaction, as measured by DSC, at 136° C. The low temperature cure peak area was 7.3 cal./g.

Example 5a

A mixture of 25 parts by weight of the cross-linking polymer prepared in Example 5 and 100 parts by weight of a solid novolac resin analogous to the solid novolac resin commercially available as Plenco® 13157 novolac resin had a maximum rate of reaction, as measured by DSC, at 134° C. The low temperature cure peak area was 7.4 cal./g.

Example 6a

A mixture of 11 parts by weight of the cross-linking polymer prepared in Example 6, and 100 parts by weight of a liquid resole resin commercially available as Plenco® 11635 resole resin from Plastics Engineering Company had a cure speed 30% faster than the untreated Plenco® 11635 resole resin, and the same shelf life as untreated Plenco® 11635 resole resin.

Example 7a

A mixture of 25 parts by weight of the cross-linking polymer prepared in Example 7 and 100 parts by weight of a solid novolac resin analogous to the solid novolac resin commercially available as Plenco® 13157 novolac resin had a maximum rate of reaction, as measured by DSC, at 136° C. The low temperature cure peak area was 2.35 cal./g.

Example 8a

A mixture of 25 parts by weight of the cross-linking polymer prepared in Example 8 and 100 parts by weight of a solid novolac resin analogous to the solid novolac resin commercially available as Plenco® 13157 novolac resin had a maximum rate of reaction, as measured by DSC, at 143° C. The low temperature cure peak area was 4.8 cal./g.

Example 9a

A mixture of 25 parts by weight of the cross-linking polymer prepared in Example 9 and 100 parts by weight of a solid novolac resin analogous to the solid novolac resin commercially available as Plenco® 13157 novolac resin had a first cure peak, as measured by DSC, at 136° C. The low temperature cure peak area was 0.4 cal./g.

Example 10a

A mixture of 25 parts by weight of the cross-linking polymer prepared in Example 10 and 100 parts by weight of a solid novolac resin analogous to the solid novolac resin commercially available as Plenco® 13157 novolac resin had a maximum rate of reaction, as measured by DSC, at 144° C. The low temperature cure peak area was 8.53 cal./g.

Example 11a

A mixture of 10 parts by weight of the cross-linking polymer prepared in Example 11 and 100 parts by weight of a solid novolac resin analogous to the solid novolac resin commercially available as Plenco® 13157 novolac resin had a maximum rate of reaction, as measured by DSC, at 142° C. The low temperature cure peak area was 7.4 cal./g.

Example 14
Curing of a Novolac Resin Using Hexamethylenetetramine and the Crosslinking Polymer Prepared in Example 1

A mixture of 12 parts by weight of the cross-linking polymer prepared in Example 1, 10 parts by weight of hexamethylenetetramine, and 100 parts by weight of a solid novolac resin analogous to the solid novolac resin commercially available as Plenco® 13157 novolac resin had a maximum rate of reaction, as measured by DSC, at 146° C. The low temperature cure peak area was 9.21 cal./g and the total cure area was 19.18 cal./g.

Example 15

Comparative Example

Curing of a Novolac Resin Using Hexamethylenetetramine

A mixture of 10 parts by weight of hexamethylenetetramine and 100 parts by weight of a solid novolac resin analogous to the solid novolac resin commercially available as Plenco® 13157 novolac resin had a maximum rate of reaction, as measured by DSC, at 150° C. The low temperature cure peak area was 10.14 cal./g and the total cure area was 22.68 cal./g.

Example 16

Comparative Example

Curing of a Novolac Resin Using a Conventional Resole

A mixture of 20 parts by weight of a solid resole resin analogous to the resole resin commercially available as Plenco® 12114 resole resin from Plastics Engineering Company and 100 parts by weight of a solid novolac resin analogous to the solid novolac resin commercially available as Plenco® 13157 novolac resin had a maximum rate of reaction, as measured by DSC, at 167° C. The total cure area was 16.71 cal./g.

Example 16a

Comparative Example

Curing of a Novolac Resin Using a Conventional Resole

A mixture of 52 parts by weight of a solid resole resin analogous to the resole resin commercially available as Plenco® 12114 resole resin and 100 parts by weight of a solid novolac resin analogous to the solid novolac resin commercially available as Plenco® 13157 novolac resin had a maximum rate of reaction, as measured by DSC, at 170° C. The total cure area was 25.00 cal./g.

A summary of the Differential Scanning Calorimetry data obtained in Examples 1a–5a, 7a–11a and 14–16a is provided below in Table 1.

TABLE 1

Summary of Differential Scanning Calorimetry Results

| Novolac Resin Cured With: | Cure Peak Temperature (° C.) |
|---|---|
| Polymer of Example 1 (Ex. 1a) | 142 |
| Polymer of Example 2 (Ex. 2a) | 140 |
| Polymer of Example 3 (Ex. 3a) | 135 |
| Polymer of Example 4 (Ex. 4a) | 136 |
| Polymer of Example 5 (Ex. 5a) | 134 |
| Polymer of Example 7 (Ex. 7a) (FIG. 2) | 136 |
| Polymer of Example 8 (Ex. 8a) | 143 |
| Polymer of Example 9 (Ex. 9a) (FIG. 1) | 136 |
| Polymer of Example 10 (Ex. 10a) | 144 |
| Polymer of Example 11 (Ex. 11a) | 142 |
| Hexamethylenetetramine & Polymer of Example 1 (Example 14) | 146 |
| Hexamethylenetetramine (Comparative Example 15) | 150 |
| Resole Resin (Comparative Example 16) | 167 |
| Resole Resin (Comparative Example 16a) | 170 |

Analysis of the DSC Results of Examples 1a–11a and 14–16a

From a review of Examples 1a–11a and 14–16a, it can be seen that a polymer in accordance with the present invention is advantageous when employed as a curing agent for novolac resins. It is particularly advantageous in that the polymer may be used to crosslink a novolac resin without the addition of hexamethylenetetramine and with no hexamethylenetetramine detected by water extraction. The polymer accelerates the cure of a novolac resin, compared to hexamethylenetetramine due to a lower temperature cure onset and a lower temperature cure peak. The polymer also accelerates the cure of a novolac resin, compared to conventional resole resins due to a lower temperature cure peak. The polymer also accelerates the cure of a novolac resin already containing hexamethylenetetramine by lowering the cure onset and cure peak temperatures.

Figure 2:
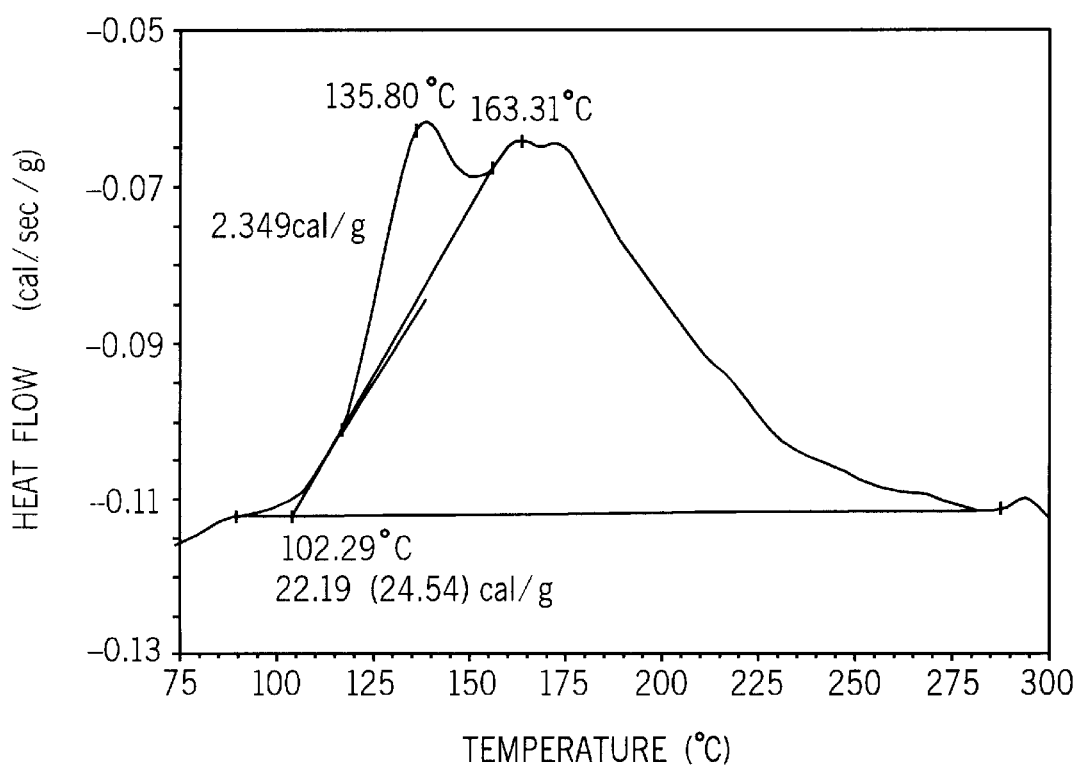
FIG. 2 is a differential scanning calorimetry graph of a novolac resin cured with another polymer composition in accordance with the invention.

In order to show the effects that the level of hexamethylenetetramine in the polymer of the invention have on the lowering of the temperature of the onset of cure of a novolac resin, the differential scanning calorimetry graphs for Examples 7a and 9a have been included as FIGS. 1 and 2. FIG. 1 shows the curing of a novolac resin using the polymer of Example 9 (a formaldehyde to phenol monomer mole ratio of=2.2; and a hexamethylenetetramine to phenol monomer mole ratio of 0.11); and FIG. 2 shows the curing of a novolac resin using the polymer of Example 7 (a formaldehyde to phenol monomer mole ratio of=2.0; and a hexamethylenetetramine to phenol monomer mole ratio of 0.18). Looking first at FIG. 1, it can be seen that a lower cure peak appears at 135.78° C. when the amine to phenolic monomer mole ratio in the polymer is 0.11. As the amine to phenolic monomer mole ratio in the polymer is increased to 0.18 as in FIG. 2, the lower cure peak at 135.8° C. becomes greater.

Examples of the Curing of a Polymer in Accordance with the Invention

Example 17

The curing temperature of a crosslinking polymer prepared in Example 11 (which had an unreacted free phenol level of 0.2%) was evaluated using DSC, and had a maximum rate of reaction, as measured by DSC, at 243° C. The low temperature cure peak area was 35.5 cal./g and the total cure area was 74.05 cal./g.

Example 18

Comparative Example

Curing of a Conventional Solid Resole

The curing temperature of a solid resole resin analogous to the resole resin commercially available as Plenco® 12114 resole resin (which had an unreacted free phenol level of 6%) was evaluated using DSC, and had a maximum rate of reaction, as measured by DSC, at 161° C. The low temperature cure peak area was 18.89 cal./g and the total cure area was 40.41 cal./g.

Analysis of the DSC Results of Examples 17 and 18

From a review of Examples 17 and 18, it can be seen that a polymer in accordance with the present invention is advantageous when employed as a curing agent for novolac resins. It is particularly advantageous in that the polymer has very little reactivity towards itself, yet can retain high reactivity towards novolac resins as shown in Examples 1a–11a. The low reactivity of the polymer towards itself is shown by the very high cure temperature of the pure crosslinking resin of Example 17, compared to the cure of a conventional resole resin in Example 18.

Effect of Aldehyde and Amine Molar Ratios on Unreacted Phenol in the Polymer

Example 19

A series of experiments was performed to determine the effect that the aldehyde to phenolic monomer molar ratio and the amine to phenolic monomer molar ratio have on the level of unreacted free phenol in a polymer prepared in accordance with the present invention. Cross-linking polymers were prepared as Examples 19a–19dddd using the procedure of Example 1 with a formaldehyde to phenol monomer molar ratio and a hexamethylenetetramine (HMTA) to phenol molar ratio as shown in Table 2. The unreacted free phenol weight percentage of each of Examples 19a–19dddd was then measured and is included in Table 2.

TABLE 2

Unreacted Phenol in the Polymer as a Function of Aldehyde and Amine Levels

| Example Number | Formaldehyde Molar Ratio | HMTA Molar Ratio | Unreacted Phenol (%) |
|---|---|---|---|
| 19a | 2.22 | 0.25 | 0.16 |
| 19b | 2.22 | 0.14 | 0.18 |
| 19c | 2.22 | 0.25 | 0.21 |
| 19d | 2.54 | 0.11 | 0.21 |
| 19e | 2.54 | 0.38 | 0.23 |
| 19f | 2.22 | 0.38 | 0.24 |
| 19g | 2.22 | 0.25 | 0.29 |
| 19h | 2.22 | 0.25 | 0.29 |
| 19i | 2.54 | 0.11 | 0.34 |
| 19j | 2.44 | 0.30 | 0.38 |
| 19k | 2.22 | 0.08 | 0.39 |
| 19l | 2.44 | 0.30 | 0.39 |
| 19m | 2.54 | 0.38 | 0.39 |
| 19n | 2.38 | 0.11 | 0.44 |
| 19o | 2.22 | 0.25 | 0.46 |
| 19p | 2.22 | 0.25 | 0.49 |
| 19q | 2.22 | 0.20 | 0.49 |
| 19r | 2.54 | 0.25 | 0.49 |
| 19s | 2.44 | 0.30 | 0.56 |
| 19t | 2.54 | 0.25 | 0.57 |
| 19u | 2.22 | 0.11 | 0.60 |
| 19v | 1.99 | 0.25 | 0.61 |
| 19w | 2.22 | 0.38 | 0.63 |
| 19x | 1.99 | 0.25 | 0.68 |
| 19y | 1.99 | 0.25 | 0.76 |
| 19z | 2.05 | 0.18 | 0.85 |
| 19aa | 1.89 | 0.25 | 0.88 |
| 19bb | 1.89 | 0.38 | 0.89 |
| 19cc | 1.89 | 0.38 | 0.99 |
| 19dd | 1.77 | 0.22 | 1.08 |
| 19ee | 2.22 | 0.03 | 1.10 |
| 19ff | 1.89 | 0.38 | 1.17 |
| 19gg | 1.89 | 0.11 | 1.28 |
| 19hh | 1.50 | 0.13 | 1.34 |
| 19ii | 1.63 | 0.22 | 1.34 |
| 19jj | 1.89 | 0.11 | 1.40 |
| 19kk | 1.63 | 0.20 | 1.80 |
| 19ll | 1.63 | 0.20 | 1.83 |
| 19mm | 1.63 | 0.20 | 1.86 |
| 19nn | 1.89 | 0.11 | 1.87 |
| 19oo | 1.63 | 0.20 | 1.88 |
| 19pp | 1.50 | 0.20 | 1.89 |
| 19qq | 1.50 | 0.20 | 1.90 |
| 19rr | 1.50 | 0.20 | 2.10 |
| 19ss | 1.50 | 0.13 | 2.13 |
| 19tt | 1.63 | 0.13 | 2.16 |
| 19uu | 1.63 | 0.13 | 2.20 |
| 19vv | 1.63 | 0.13 | 2.26 |
| 19ww | 1.50 | 0.13 | 2.27 |
| 19xx | 1.50 | 0.13 | 2.30 |
| 19yy | 1.50 | 0.20 | 2.35 |
| 19zz | 1.63 | 0.20 | 2.41 |
| 19aaa | 1.50 | 0.13 | 2.45 |
| 19bbb | 1.63 | 0.10 | 2.45 |
| 19ccc | 1.63 | 0.20 | 2.45 |
| 19ddd | 1.63 | 0.13 | 2.47 |
| 19eee | 1.50 | 0.20 | 2.52 |
| 19fff | 1.63 | 0.13 | 2.52 |
| 19ggg | 1.50 | 0.20 | 2.56 |
| 19hhh | 1.50 | 0.20 | 2.60 |
| 19iii | 1.50 | 0.20 | 2.63 |
| 19jjj | 1.50 | 0.15 | 2.67 |
| 19kkk | 1.50 | 0.20 | 2.74 |
| 19lll | 1.50 | 0.13 | 2.75 |
| 19mmm | 1.50 | 0.13 | 2.77 |
| 19nnn | 1.50 | 0.13 | 2.82 |
| 19ooo | 1.50 | 0.20 | 2.86 |
| 19ppp | 1.63 | 0.07 | 2.86 |
| 19qqq | 1.50 | 0.20 | 2.90 |
| 19rrr | 1.63 | 0.07 | 3.12 |

TABLE 2-continued

Unreacted Phenol in the Polymer as a Function of Aldehyde and Amine Levels

| Example Number | Formaldehyde Molar Ratio | HMTA Molar Ratio | Unreacted Phenol (%) |
|---|---|---|---|
| 19sss | 1.63 | 0.07 | 3.14 |
| 19ttt | 1.50 | 0.20 | 3.19 |
| 19uuu | 1.63 | 0.07 | 3.23 |
| 19vvv | 1.63 | 0.20 | 3.35 |
| 19www | 1.50 | 0.15 | 3.38 |
| 19xxx | 1.63 | 0.07 | 3.46 |
| 19yyy | 1.50 | 0.13 | 3.49 |
| 19zzz | 1.50 | 0.13 | 3.50 |
| 19aaaa | 1.63 | 0.07 | 3.76 |
| 19bbbb | 1.63 | 0.07 | 3.96 |
| 19cccc | 1.45 | 0.04 | 5.90 |
| 19dddd | 1.45 | 0.04 | 6.84 |

Analysis of the Results of Example 19

From a review of Table 2, it can be seen that the amount of unreacted phenolic monomer in a polymer prepared in accordance with the present invention can be controlled by adjusting the aldehyde to phenolic monomer molar ratio and the amine to phenolic monomer molar ratio. It is apparent that free phenol levels less than about 3 weight percent can be readily attained in a polymer prepared in accordance with the present invention.

Effect of Amine Molar Ratios on Reactivity of the Polymer

Example 20

A series of experiments was performed to determine the effect that the amine to phenolic monomer molar ratio have on the reactivity of a polymer prepared in accordance with the present invention. Cross-linking polymers were prepared as Examples 20(a)–20(r) using the procedure of Example 1 with a formaldehyde to phenol monomer molar ratio and a hexamethylenetetramine (HMTA) to phenol molar ratio as shown in Table 3. The curing of a mixture of the cross-linking polymer prepared in Examples 20(a)–20(r) and 100 parts by weight of a solid novolac resin analogous to the solid novolac resin commercially available as Plenco® 13157 novolac resin were evaluated by DSC to measure the cure area and cure temperature. The results are shown in Table 3.

TABLE 3

| Example Number | Formaldehyde Molar Ratio | HMTA Molar Ratio | Main Cure Area (cal./g.) | Total Cure Area (cal./g.) | Peak Cure Temperature (C.) |
|---|---|---|---|---|---|
| 20(a) | 2.22 | 0.38 | 6.7 | 22.9 | 141 |
| 20(b) | 2.54 | 0.38 | 6.3 | 23.0 | 142 |
| 20(c) | 2.54 | 0.11 | 0.0 | 21.9 | 164 |
| 20(d) | 2.22 | 0.38 | 4.5 | 18.8 | 143 |
| 20(e) | 2.22 | 0.11 | 0.4 | 19.7 | 164 |
| 20(f) | 1.89 | 0.38 | 5.7 | 19.8 | 141 |
| 20(g) | 2.54 | 0.25 | 3.4 | 23.0 | 140 |
| 20(h) | 1.89 | 0.11 | 0.8 | 18.2 | 136 |
| 20(i) | 2.38 | 0.11 | 0.3 | 22.1 | 162 |
| 20(j) | 1.89 | 0.38 | 4.2 | 17.2 | 142 |
| 20(k) | 2.54 | 0.25 | 4.6 | 17.4 | 143 |
| 20(l) | 1.89 | 0.11 | 0.3 | 19.6 | 163 |
| 20(m) | 2.05 | 0.18 | 2.4 | 22.9 | 136 |
| 20(n) | 1.89 | 0.25 | 2.4 | 17.7 | 141 |
| 20(o) | 2.54 | 0.38 | 5.8 | 27.8 | 143 |
| 20(p) | 2.22 | 0.25 | 3.5 | 16.6 | 139 |
| 20(q) | 2.54 | 0.11 | 0.0 | 16.5 | 164 |
| 20(r) | 1.89 | 0.38 | 5.4 | 19.8 | 139 |

Analysis of the Results of Example 20

From a review of Example 20, it can be seen that the reactivity of a polymer prepared in accordance with the present invention can be controlled by adjusting the amine to phenolic monomer molar ratio. Specifically, at an amine to phenolic monomer molar ratio of at least about 0.12:1, a polymer prepared in accordance with the present invention can be used to cure a novolac resin at a lower temperature compared to conventional novolac curing agents.

Effect of A Blend of the Polymer and a Conventional Curing Agent on Novolac Cure Example 21

A series of experiments was performed to determine the effect that a blend of a polymer prepared in accordance with the present invention and a conventional curing agent have on the curing of a novolac resin. The curing of a mixture of the cross-linking polymer prepared in Example 1, hexamethylenetetramine, and 100 parts by weight of a solid novolac resin analogous to the solid novolac resin commercially available as Plenco® 13157 novolac resin were evaluated by DSC to measure the main cure peak in cal./g. The parts by weight of the cross-linking polymer prepared in Example 1 and the parts by weight of hexamethylenetetramine used in the blends of Examples 21(a)–21(k) and the Main Cure Peak measured during the curing of these blends are shown in Table 4.

TABLE 4

Main Cure Peak for Blends of the Polymer and a Known Curing Agent

| Example Number | Parts of the Polymer of Example 1 per 100 parts of Novolac Resin | Parts of HMTA per 100 Parts of Novolar Resin | Main Cure Peak (cal./g.) |
|---|---|---|---|
| 21(a) | 10 | 10 | 13.8 |
| 21(b) | 5 | 0 | 3.8 |
| 21(c) | 20 | 0 | 12.2 |
| 21(d) | 0 | 5 | 8.5 |
| 21(e) | 5 | 10 | 14.9 |
| 21(f) | 20 | 15 | 8.8 |
| 21(g) | 5 | 20 | 16.9 |
| 21(h) | 20 | 5 | 14.6 |
| 21(i) | 0 | 20 | 17.5 |
| 21(j) | 10 | 5 | 13.2 |
| 21(k) | 15 | 20 | 18.7 |

Analysis of the Results of Example 21

From a review of Table 4, it can be seen that the curing of a novolac resin can be accelerated by using a curing agent including a polymer prepared in accordance with the present invention and a conventional curing agent such as hexamethylenetetramine. In addition, the amount of crosslinking in a novolac resin can be controlled by adjusting the amount of a polymer prepared in accordance with the present invention and the amount of a conventional curing agent in a curing agent blend used to cure the novolac resin.

Applications of a Polymer in Accordance with the Invention

The crosslinking polymer composition in accordance with the present invention can be used to cure novolac resins and has particular utility in curing novolac binders. The polymer composition can be substituted for hexamethylenetetramine as a curing/cross linking agent for novolac resins. The polymer composition can also be substituted for resoles as a curing/cross linking agent for novolac resins. In addition, the polymer composition can be used in combination hexamethylenetetramine and/or resoles as a cure accelerator and a flow modifier.

Non-limiting examples of applications include: binding of recycled cellulosic felt used in the automotive industry; binding of refractory materials; binding of fiber materials; binding of molding compositions; binding of friction products such as brake pads, and the binding of foundry sands and oil field propant sands. Methods of applying and using conventional curing agents, such as hexamethylenetetramine and resole resins, can be used in the application of the crosslinking polymer composition of this invention. The polymer composition may be supplied in liquid or solid form. Those skilled in the art will recognize that an effective amount of the composition of this invention can be mixed with dry or liquid novolac resins to replace conventional curing agents. An effective amount is the amount of crosslinking polymer composition of this invention required to yield the desired extent of cure. Because of the low free phenol levels and the low formaldehyde levels associated with the crosslinking polymer composition of this invention, processes employing the curing agent of the present invention have greatly diminished environmental impact. In addition, the polymer has extended shelf life when stored alone or admixed with novolac resins.

The crosslinking polymer composition in accordance with the present invention is particularly advantageous in: the curing of novolac resins that are used as a binder in a thermally insulating matrix, such as glass, ceramic, wood, cotton or synthetic fibers, where a lower novolac cure temperature is desirable; applications that use a novolac resin in an aqueous slurry where a curing agent such as hexamethylenetetramine is lost through dissolution and hydrolysis; and the curing of novolac resins where volatile emissions, such as ammonia, must be controlled.

Use of a Polymer in Accordance with the Invention in a Molding Composition

In order to demonstrate the effectiveness of the crosslinking polymer composition of this invention when used to cure a novolac binder used in a molding composition, molding compositions were prepared using: (1) a solid novolac resin analogous to the solid novolac resin commercially available as Plenco® 13157 novolac resin, a filler, and hexamethylenetetramine (HMTA) as a curing agent; and (2) a solid novolac resin analogous to the solid novolac resin commercially available as Plenco® 13157 novolac resin, a filler, and a crosslinking polymer composition of the present invention as a curing agent. The parts by weight of each of the components of each molding composition and the physical and chemical properties of the molded product after molding and cure are shown as Examples 22–30 in Table 5.

TABLE 5

Molded Products Made with Novolac Resin and HMTA or the Crosslinking Polymer as Curing Agent

| Component | Examples | | | | | | | | |
|---|---|---|---|---|---|---|---|---|---|
| | 22 | 23 | 24 | 25 | 26 | 27 | 28 | 29 | 30 |
| Novolac 13157 | 1500 | 1500 | 1500 | 1500 | 1500 | 1500 | 1500 | 1500 | 1500 |
| Wood Flour 100 mesh | 950 | 0 | 0 | 0 | 0 | 0 | 0 | 0 | 0 |
| Wood Flour 120 mesh | 0 | 950 | 950 | 950 | 950 | 950 | 950 | 950 | 950 |
| HMTA | 250 | 0 | 0 | 0 | 0 | 0 | 0 | 0 | 0 |
| Fine HMTA | 0 | 250 | 0 | 0 | 200 | 0 | 0 | 0 | 0 |
| Polymer of Example 12a | 0 | 0 | 250 | 375 | 0 | 0 | 0 | 0 | 0 |
| Polymer of Example 11a | 0 | 0 | 0 | 0 | 0 | 250 | 375 | 0 | 0 |
| Polymer of Example 13a | 0 | 0 | 0 | 0 | 0 | 0 | 0 | 250 | 375 |
| After Molding | | | | | | | | | |
| Specific Gravity | 1.49 | 1.49 | 1.49 | 1.48 | 1.49 | 1.49 | 1.48 | 1.51 | 1.48 |
| Small Cup (sec.) | 4 | 4 | 8 | 11 | 5 | 7 | 9 | 10 | 9 |
| Cup Deflection (in.) | 0.097 | 0.077 | 0.647 | 0.334 | 0.170 | 0.503 | 0.125 | 0.275 | 0.132 |
| Brabender Total (mm.) | 144 | 131 | 64 | 51 | 123 | 61 | 53 | 48 | 55 |
| Brabender Low Torque (m*g) | 836 | 865 | 1572 | 1942 | 915 | 1491 | 1792 | 2072 | 1651 |
| Mold Shrinkage | 0.006 | 0.006 | 0.006 | 0.005 | 0.007 | 0.006 | 0.004 | 0.006 | 0.005 |
| Flexural Strength | 90.8 | 89.3 | 82.7 | 85.4 | 79.2 | 77.7 | 84.0 | 82.5 | 81.0 |
| Flexural Modulus | 8,478 | 8,289 | 9,053 | 8,840 | 8,510 | 8,701 | 8,834 | 8,694 | 8,625 |
| Heat Resistance | 200 | 210 | 210 | 210 | 210 | 210 | 210 | 210 | 210 |

Use of a Polymer in Accordance with the Invention in a Foundry Sand Coating

Example 31

A 1,000 gram portion of foundry silica sand commercially available as T2380A sand from Badger Mining of Fairwater, Wis., USA was heated in an oven to 375° F. The hot sand was then transferred to a heated Hobart Kitchen-Aid brand mixer where 30 grams of a conventional flake foundry resin commercially available as Plenco® 12462 from Plastics Engineering Co., Sheboygan, Wis. was added and blended until all the resin had melted and the sand was thoroughly coated. At this point, 6 grams of the solution from Example 6 was added, blended for 60 seconds, and poured onto a cool surface to cool. When placed in a core mold at 375° F., the resin was found to cure in less than 60 seconds forming a well consolidated sand core suitable for casting metal parts.

Use of a Polymer in Accordance with the Invention in a Paper Laminate

Example 32

A 100 gram portion of the solution from Example 6 was added to 500 grams of a methanol solution of a phenol formaldehyde resole commercially available as Plenco® 11635 from Plastics Engineering Co., Sheboygan, Wis. to form a first mixture. The first mixture was then utilized to saturate 20 sheets of a commercially available Kraft paper which was then dried overnight in an air stream, then further dried at 280° F. for approximately 5 minutes to yield a non-tacky Kraft prepreg. Ten sheets of the above treated Kraft paper were then placed between polished steel plates and molded under a total pressure of 500 lbs. per square inch at 350° F. to produce a well cured laminate.

Use of a Polymer in Accordance with the Invention in a Fabric Cloth Laminate

Example 33

A 100 gram sample of the solution from Example 6 was diluted with 500 grams of a methanol solution of a novolac resin commercially available as Plenco® 10212 to form a second mixture. The second mixture was used to treat 20—12×12" sheets of Nomex® brand aramid fabric cloth which was dried in the air and then at 280° F. as above. These treated cloths were molded between polished steel plates as in Example 32 above, to yield essentially void free heat resistant laminates.

Use of a Polymer in Accordance with the Invention in a Glass Laminate

Example 34

A similar amount of the first mixture of Example 32 was also used to treat 181 weave S glass. The treated glass was then dried and molded as above to produce an essentially void free, strong glass laminate.

A similar amount of the second mixture of Example 33 was also used to treat 181 weave S glass. The treated glass was then dried and molded as above to produce an essentially void free, strong glass laminate.

Use of a Polymer in Accordance with the Invention in a Molded Textile Felt

Example 35

A 100 gram sample of the composition from example 1A was placed in a 20 gallon fiber drum equipped with a tight fitting cover which had been modified to accept a high pressure air hose in one end and a cloth filter taped over a 3" diameter hole in the opposite end. A 400 gram sample of recycled, fiberized cotton cloth, commonly known in the industry as textile felt or shoddy, and 5 gram sample of zinc stearate were then placed into this drum. The lid was replaced and the mixture alternately tumbled and injected with high pressure air until the textile felt and the composition from example 1A were thoroughly blended. This mixture was then discharged and spread by hand to a thickness of approximately 4 inches. This 4" thick mat was placed in a forced draft oven at 280° F. for 2 minutes, removed, cooled, and cut into 12"×12"×4" thick pre-forms. These pre-forms were molded into of 1", ½" and approximately ¼" thick specimens using a press having a platen temperature of 375° F. In all cases, the molded textile felt was well bonded and very stiff. Among other things, this demonstrates the utility of the composition from Example 1A in the molding of automotive interior parts.

Use of a Polymer in Accordance with the Invention in Propant Sand Preparation

Example 36

A 1000 gram sample of special silica sand characterized by a fairly narrow particle size distribution was heated to a temperature of 390° F. in an air oven until the moisture content was below 0.5%. This hot sand was then transferred to an insulated mixing bowl of a Hobart brand mixer and one gram of a silane surface treating agent, such as A-1100 commercially available from Union Carbide or Z-6020 commercially available from Dow Corning, was added and the mixture was blended for 20 seconds. Then, 20 grams of a resin commercially available as Plenco® 12462 from Plastics Engineering Co., Sheboygan, Wis., which is prepared to contain less than 9.5% free phenol, was added and the mixture was blended until the sand was thoroughly coated (about 30–45 seconds). Then, 6 grams of the solution from Example 6 was added, blended for an additional 1 minute and poured onto a cool surface to cool.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the scope of the appended claims should not be limited to the description of the preferred embodiments contained herein.

What is claimed is:

1. A curing agent for curing a novolac resin, the curing agent comprising the product of:
    mixing and reacting in aqueous solution a phenolic monomer and an aldehyde to form an intermediate resin; and
    thereafter reacting the intermediate resin with an amine,
    wherein the amine to phenolic monomer molar ratio is at least about 0.12:1, and
    wherein the aldehyde to phenolic monomer molar ratio is at least about 1.0:1.

2. The curing agent of claim 1 wherein:
    the aldehyde to phenolic monomer molar ratio is at least about 2.0:1.

3. The curing agent of claim 1 wherein:
    the aldehyde is formaldehyde.

4. The curing agent of claim 1 wherein:
    the phenolic monomer is selected from the group consisting of phenol, cresol isomers, resorcinol, xylenol isomers, cardanol, and mixtures thereof.

5. The curing agent of claim 1 wherein:
the unreacted phenolic monomer in the curing agent is less than about 3 weight percent.
6. The curing agent of claim 1 wherein:
the unreacted phenolic monomer in the curing agent is less than about 1 weight percent.
7. The curing agent of claim 1 wherein:
the unreacted phenolic monomer in the curing agent is less than about 0.5 weight percent.
8. The curing agent of claim 1 wherein:
the unreacted aldehyde in the curing agent is less than about 0.1 weight percent.
9. The curing agent of claim 1 wherein:
the aldehyde and the phenolic monomer aro reacted in the presence of a neutral or basic catalyst.
10. The curing agent of claim 9 wherein:
the neutral or basic catalyst to phenolic monomer molar ratio is about 0.01:1 to about 0.03:1.
11. The curing agent of claim 9 wherein:
any basic catalyst is neutralized with an acid before the intermediate resin is reacted with the amine.
12. The curing agent of claim 1 wherein:
an organic solvent is added after the intermediate resin is reacted with the amine.
13. The curing agent of claim 1 wherein:
the amine is hexamethylenetetramine.
14. The curing agent of claim 1 wherein:
the curing agent remains essentially unchanged for over a year.
15. The curing agent of claim 13 wherein:
the amine to phenolic monomer molar ratio is about 0.12:1 to about 0.25:1.
16. The curing agent of claim 1 wherein:
the amine is ammonia, and
the amine to phenolic monomer molar ratio is at least about 0.48:1.
17. The curing agent of claim 1 wherein:
the composition has a softening point between about 70° C. and about 120° C.
18. A curing agent for curing a novolac resin, the curing agent comprising the product of:
mixing and reacting in aqueous solution a phenolic monomer and an aldehyde in the presence of a basic catalyst to form an intermediate resin; and
thereafter reacting the intermediate resin with hexamethylenetetramine,
wherein the aldehyde to phenolic monomer molar ratio is at least about 2.0:1, and
the hexamethylenetetramine to phenolic monomer molar ratio is at least about 0.12:1.
19. The curing agent of claim 18 wherein:
the aldehyde is formaldehyde. and
the phenolic monomer is selected from the group consisting of phenol, cresol isomers, resorcinol, xylenol isomers, cardanol, and mixtures thereof.
20. The curing agent of claim 19 wherein:
the unreacted phenolic monomer in the curing agent is less than about 0.5 weight percent.
21. The curing agent of claim 20 wherein:
the unreacted formaldehyde in the curing agent is less than about 0.1 weight percent.
22. A curable composition comprising:
a novolac resin; and
an effective amount of the curing agent of claim 1.

23. The curable composition of claim 22 comprising:
about 20 weight percent to about 98 weight percent of the novolac resin; and
about 2 weight percent to about 80 weight percent of the curing agent.
24. The curable composition of claim 23 further comprising:
a second curing agent that supplies methylene bridging groups.
25. The curable composition of claim 24 wherein:
the second curing agent is hexamethylenetetramine.
26. The curable composition of claim 25 comprising:
less than about 26 weight percent hexamethylenetetramine.
27. A curable composition comprising:
a novolac resin;
a filler; and
an effective amount of the curing agent of claim 1.
28. The curable composition of claim 27 wherein:
the filler is selected from the group consisting of cellulosic materials, fiber materials, refractory materials, and mixtures thereof.
29. The curable composition of claim 28 further comprising:
about 20 weight percent to about 98 weight percent of the novolac resin; and
about 2 weight percent to about 80 weight percent of the curing agent.
30. The curable composition of claim 28 further comprising:
a second curing agent that supplies methylene bridging groups.
31. The curable composition of claim 30 wherein:
the second curing agent is hexamethylenetetramine.
32. The curable composition of claim 31 comprising:
less than about 26 weight percent of hexamethylenetetramine.
33. A curing agent for accelerating the cure of a resole resin, the curing agent comprising the product of:
mixing and reacting in aqueous solution a phenolic monomer and an aldehyde to form an intermediate resin; and
thereafter reacting the intermediate resin with an amine,
wherein the amine to phenolic monomer molar ratio is at least about 0.12:1, and
wherein the aldehyde to phenolic monomer molar ratio is at least about 1.0:1.
34. The curing agent of claim 23 wherein:
the aldehyde to phenolic monomer molar ratio is at least about 2.0:1.
35. The curing agent of claim 33 wherein:
the aldehyde is formaldehyde.
36. The curing agent of claim 33 wherein:
the phenolic monomer is selected from the group consisting of phenol, cresol isomers, resorcinol, xylenol isomers, cardanol, and mixtures thereof.
37. The curing agent of claim 33 wherein:
the unreacted phenolic monormer in the curing agent is less than about 3 weight percent.
38. The curing agent of claim 33 wherein:
the unreacted phenolic monomer in the curing agent is less than about 1 weight percent.
39. The curing agent of claim 33 wherein:
the unreacted phenolic monomer the curing agent is less than about 0.5 weight percent.

40. The curing agent of claim 33 wherein:

the unreacted aldehyde in the curing agent is less than about 0.1 weight percent.

41. The curing agent of claim 33 wherein:

the aldehyde and the phenolic monomer are reacted in the presence of a neutral or basic catalyst.

42. The curing agent of claim 41 wherein:

the neutral or basic catalyst to phenolic monomer molar ratio is about 0.01:1 to about 0.03:1.

43. The curing agent of claim 41 wherein:

any basic catalyst is neutralized with an acid before the intermediate resin is reacted with the amine.

44. The curing agent of claim 33 wherein:

an organic solvent is added after the intermediate resin is reacted with the amine.

45. The curing agent of claim 33 wherein:

the amine is hexamethylenetetramine.

46. The curing agent of claim 33 wherein:

the curing agent remains essentially unchanged for over a year.

47. The curing agent of claim 45 wherein:

the amine to phenolic monomer molar ratio is about 0.12:1 to about 0.25:1.

48. The curing agent of claim 33 wherein:

the amine is ammonia, and the amine to phenolic monomer molar ratio is at least about 0.48:1.

* * * * *

UNITED STATES PATENT AND TRADEMARK OFFICE
CERTIFICATE OF CORRECTION

PATENT NO. : 6,569,918 B2  
DATED : May 27, 2003  
INVENTOR(S) : Phillip A. Waitkus et al.

It is certified that error appears in the above-identified patent and that said Letters Patent is hereby corrected as shown below:

Column 23,
Line 15, "aro" should read -- are --.

Column 24,
Line 49, "23" should read -- 33 --.
Line 60, "monormer" should read -- monomer --.
Line 66, "monomer the" should read -- monomer in the --.

Signed and Sealed this

Twenty-ninth Day of June, 2004

JON W. DUDAS
*Acting Director of the United States Patent and Trademark Office*